United States Patent [19]
Klussmann et al.

[11] Patent Number: 6,143,833
[45] Date of Patent: Nov. 7, 2000

[54] METHOD AND APPARATUS FOR PRODUCING HIPS USING CONTINUOUS POLYBUTADIENE FEED

[75] Inventors: Brad Klussmann, Houston; Jon Schweinle, Seabrook; Doug Berti, Nassau Bay; Thanh Nguyen, Sugar Land; Jose Sosa, Deer Park, all of Tex.

[73] Assignee: Fina Technology, Inc., Houston, Tex.

[21] Appl. No.: 09/262,182

[22] Filed: Jun. 11, 1999

[51] Int. Cl.$^7$ ................................................ C08F 279/02
[52] U.S. Cl. ................................................ 525/316; 523/340
[58] Field of Search ............................. 525/316; 523/340

[56] References Cited

U.S. PATENT DOCUMENTS

| | | | |
|---|---|---|---|
| 4,271,060 | 6/1981 | Hubby | 526/335 |
| 4,375,524 | 3/1983 | Rowe | 523/303 |
| 4,482,677 | 11/1984 | Teranaka et al. | 525/316 |
| 4,495,028 | 1/1985 | Rowe | 159/47.1 |
| 4,686,086 | 8/1987 | Rowe | 422/111 |
| 4,777,210 | 10/1988 | Sosa et al. | 525/53 |
| 5,955,537 | 9/1999 | Steininge-Clites et al. | 525/316 |

*Primary Examiner*—Peter A. Szekely
*Attorney, Agent, or Firm*—Jim D. Wheelington

[57] ABSTRACT

A method and apparatus for use in making high impact polystyrene by polymerizing butadiene into polybutadiene, continuously exchanging styrene monomer for the solvent used to produce the polybutadiene, and polymerizing the resultant polybutadiene/styrene solution into high impact polystyrene. Apparatus is disclosed that includes butadiene and solvent preparation means, additive metering means, butadiene polymerization means, solvent exchange means, solvent recovery means and styrene polymerization means.

17 Claims, 3 Drawing Sheets

METHOD AND APPARATUS FOR PRODUCING HIPS USING CONTINUOUS POLYBUTADIENE FEED

BACKGROUND OF INVENTION

1. Field of the Invention

This invention relates to the production of rubber-modified monovinyl aromatic polymers, and more particularly, to a method and apparatus for making high impact polystyrene (HIPS) by continuously polymerizing butadiene, exchanging the hydrocarbon solvent used in the butadiene polymerization with styrene, and feeding the resultant polybutadiene/styrene stream to a conventional HIPS production line.

2. Description of Related Art

Methods and apparatus for continuously producing polybutadiene and for producing high impact polystyrene using polybutadiene as the rubber component, are both well known. The solution polymerization of butadiene to polybutadiene in a hydrocarbon solvent is disclosed, for example, in U.S. Pat Nos. 4,271,060; 4,375,524; 4,495,028; and 4,686,086, the written descriptions of which are incorporated herein by reference. According to conventional methods, polybutadiene is made by polymerizing butadiene to about 12 weight percent solids in hexane, butane, cyclopentane, cyclohexane, or another hydrocarbon solvent; concentrating the mixture to about 30 weight percent solids by flashing off solvent; steam stripping with soap to remove additional solvent, reduce stickiness and precipitate the crumb rubber; squeezing and drying to remove excess moisture; and agglomerating the dried crumb rubber by the addition of heat to produce irregularly shaped bales. The baled rubber is then sent to intermediate storage or transported to plant sites for use in making other products such as rubber-modified polymers.

One widely used rubber-modified polymer is high impact polystyrene (HIPS). HIPS is made by polymerizing styrene monomer having dissolved in it from about 1 to about 15 percent by weight styrene-butadiene rubber (SBR) or polybutadiene rubber. Both are commonly produced with Mooney viscosities of either 35 or 55, and polybutadiene is generally less expensive than SBR. A conventional method for making HIPS using polybutadiene is disclosed, for example, in U.S. Pat. No. 4,777,210 to Sosa and Nichols, the entire written description of which is incorporated herein by reference.

When bales of polybutadiene made by conventional, prior art methods are used in HIPS production, they are segmented or chopped and ground, then dissolved in a solvent/styrene mixture prior to initiating polymerization of the styrene monomer. Because the labor, equipment, transportation, storage and energy costs associated with finishing the polybutadiene bales and later grinding and dissolving the rubber for use in making HIPS are significant and desirably avoided if possible, a method and apparatus are needed for continuously producing and supplying a polybutadiene/styrene stream to a conventional HIPS production line.

SUMMARY OF THE INVENTION

According to the present invention, methods and apparatus are provided for polymerizing butadiene into polybutadiene, continuously exchanging styrene monomer for the solvent used to produce the polybutadiene, and polymerizing the resultant polybutadiene/styrene stream into high impact polystyrene.

According to one preferred embodiment of the invention, apparatus is provided for producing HIPS that comprises, as a polybutadiene feed source, butadiene and solvent preparation means, additive metering means, butadiene polymerization means, solvent exchange means and solvent recovery means.

According to another preferred embodiment of the invention, a method is provided for making HIPS using polybutadiene, the method preferably comprising the steps of introducing sufficient butadiene to produce a polybutadiene solids level of from about 1 to about 15 weight percent and most preferably about 12 weight percent after polymerization, a suitable preheated hydrocarbon solvent, and a suitable polymerization catalyst into a continuous-stirred tank reactor (CSTR); polymerizing these components; discharging them from the CSTR into a plug-flow reactor (PFR) to complete polymerization of the butadiene; introducing styrene monomer into the stream; mixing, heating and flashing off the solvent and unreacted butadiene monomer by two-stage vacuum devolatilization to produce a polybutadiene/styrene solution; and thereafter polymerizing the solution to produce polystyrene containing dispersed rubbery particles.

The method and apparatus disclosed herein are believed to be useful for producing HIPS containing high-quality polybutadiene rubbers made with low boiling point solvents without the need or expense of finishing the polybutadiene and then grinding and redissolving it in styrene.

BRIEF DESCRIPTION OF THE DRAWING

The method and apparatus of the invention are further described and explained in relation to the following figures of the drawings in which.

DESCRIPTION OF THE PREFERRED EMBODIMENTS

Figure 1:
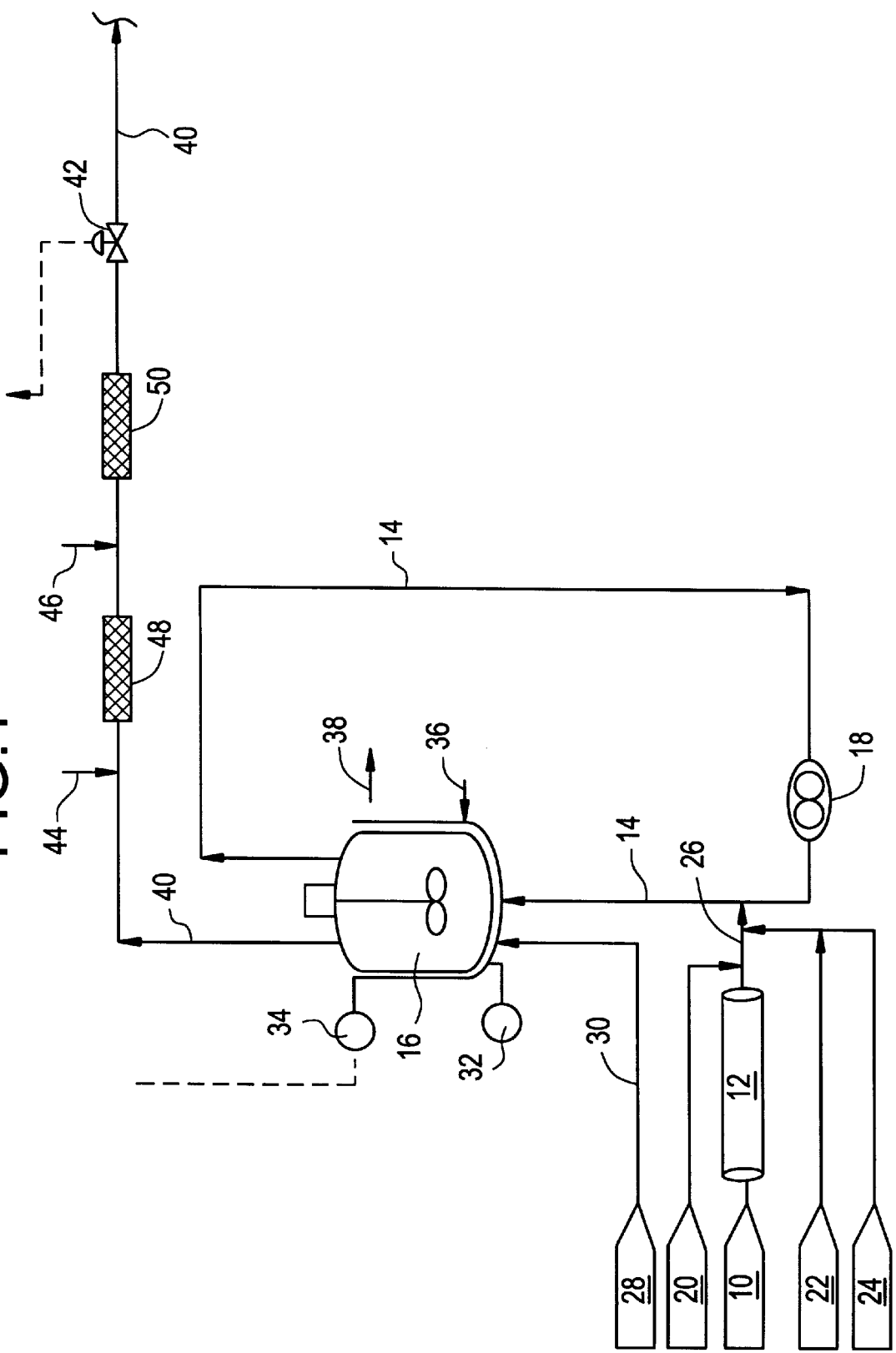
FIG. 1 is a simplified flow diagram illustrating a preferred embodiment of the polybutadiene production portion of the invention.

Referring to FIG. 1, which depicts the butadiene polymerization section of the invention, a hydrocarbon solvent is received from source 10, preheated in exchanger 12, and introduced into pumparound or recycle stream 14, which is charged to vessel 16 by pump 18. Preferred hydrocarbon solvents for use in the invention include low-boiling-point solvents having molecules containing from 4 to 6 carbon atoms. Particularly preferred solvents for use in the method of the invention include n-hexane and n-butane. Other low-boiling-point hydrocarbon solvents suitable for use in practicing the invention include, for example, cyclohexane, cyclopentane, and heptane.

Butadiene received from source 20 and minor effective amounts of tetrahydrofuran 22 and a gel inhibitor 24 such as 1, 2, butadiene, or another similarly effective inhibitor as known to those of ordinary skill in the art, are desirably injected into preheated solvent line 26 prior to introducing the preheated solvent into stream 14. A polymerization catalyst, most preferably a conventional n-butyl lithium catalyst is also charged to vessel 16 from source 28 through line 30.

Vessel 16 is preferably a stirred, jacketed reactor having temperature and pressure monitors 32, 34 and jacket water supply and return lines 36, 38, respectively. A preferred operating temperature for vessel 16 ranges from about 90° to about 120° C. and a preferred operating pressure range from about 150 to about 450 psig, depending on the polymerization solvent used. It will be appreciated by those of ordinary skill in the art, however, that the preferred operating temperatures and pressures for vessel 16 can vary within the scope of the invention according to factors such as the polymerization initiator utilized or the polymerization solvent selected.

Discharge line 40 from vessel 16 preferably functions as a plug flow reactor for the polymerization of the butadiene, and will preferably be of sufficient length and diameter to facilitate the production of from about 1 to about 15 weight percent, and most preferably about 12 weight percent, polybutadiene in the mixture. The reactor pressure is desirably controlled by control valve 42 in response to signals received from pressure monitor 34. According to a particularly preferred embodiment of the invention, a coupling agent and antioxidant are metered into line 40 from sources 44, 46, respectively by any conventional, commercially available means, and static mixers 48, 50 are provided to facilitate dispersal of those materials into the polybutadiene mixture.

Those of ordinary skill in the art will appreciate that the butadiene polymerization process as described above in relation to FIG. 1 does not differ materially from the solution polymerization processes practiced commercially by other manufacturers of polybutadiene rubbers. Many operational details are omitted because they are well known and described in the literature. Some polybutadiene manufacturers have disclosed particular methods for improving yields, reducing solvent requirements, and the like, by implementing other apparatus or procedures that may also fall within the scope of the present invention when combined with the other elements disclosed herein. None are known, however, to have disclosed an apparatus or method for diluting a reacted polybutadiene/solvent mixture with a monovinyl aromatic monomer such as styrene and thereafter exchanging the solvent by flashing it off through vacuum devolatilization to produce a feed stream for the polymerization of a rubber-modified vinyl aromatic polymer such as high impact polystyrene.

Figure 2:
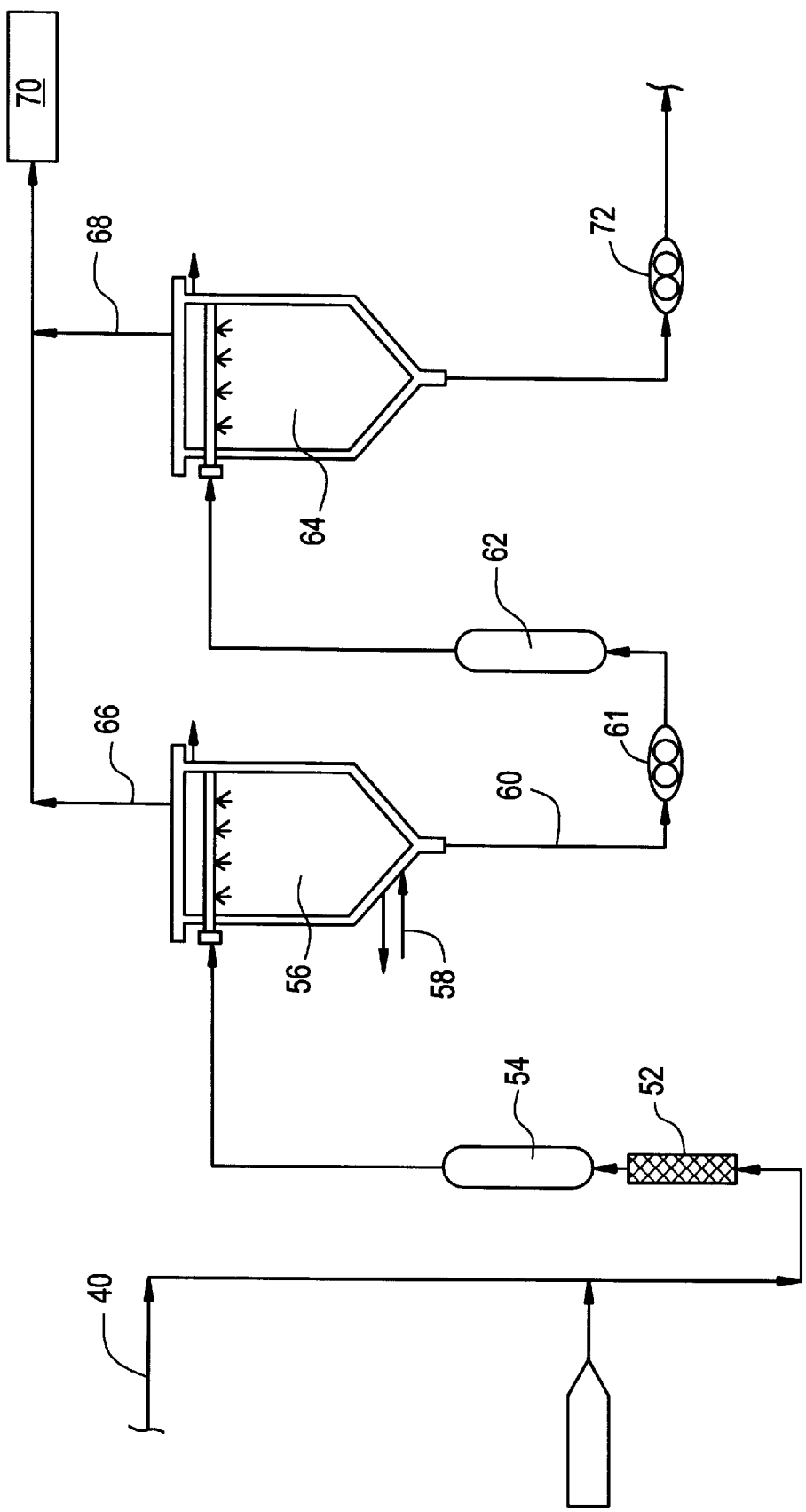
FIG. 2 is a simplified flow diagram illustrating a preferred embodiment of the solvent exchange portion of the invention.

Referring to FIG. 2, which depicts the solvent exchange section of the invention, a vinyl aromatic monomer, most preferably styrene, is introduced into line 40 upstream from control valve 42, and is desirably dispersed throughout the rubber mixture by conventional static mixer 52. The diluted mixture is then preferably preheated in exchanger 54 and introduced into first devolatilizer 56 to flash off the hydrocarbon solvent. Devolatilizer 56 is a conventional vacuum devolatilization unit that is jacketed to permit the circulation of hot water 58 and is desirably operated at a pressure of about 140 mbar where the hydrocarbon solvent being flashed off has a boiling point ranging from about that of hexane (66° C.) to that of butane (61° C.). Devolatilizers are preferred for use in the invention to assist in removing the solvent. According to a particularly preferred embodiment of the invention, the partially devolatilized polymer stream 60 is moved by pump 61 from the bottom of devolatilizer 56 to be further heated in exchanger 62, and then introduced into a second devolatilizer 64 constructed and operated similarly to devolatilizer 56.

Overhead vapor streams 66, 68 containing solvent, unreacted butadiene and unreacted vinyl aromatic monomer from both devolatilizers are combined and directed to a conventional vapor recovery section 70 comprising conventional separation equipment (not shown) for separately recovering the hydrocarbon solvent and unreacted vinyl aromatic monomer. The solution discharged from the bottom of devolatilizer 64 preferably contains from about 5 to about 12 weight percent polybutadiene and is transferred by pump 72 to the styrene polymerization section of the invention, as depicted in FIG. 3.

The solvent exchange and recovery operations described herein are desirably controlled so as to prevent any significant carryover of butadiene into the styrene polymerization section due to its high potential for gelling. Solvent contamination of the styrene/polybutadiene stream is also desirably reduced to levels of less than about 1000 ppm, and most preferably less than about 100 ppm. Using a lighter solvent such as butane instead of hexane should facilitate separation of the solvent from styrene.

Figure 3:
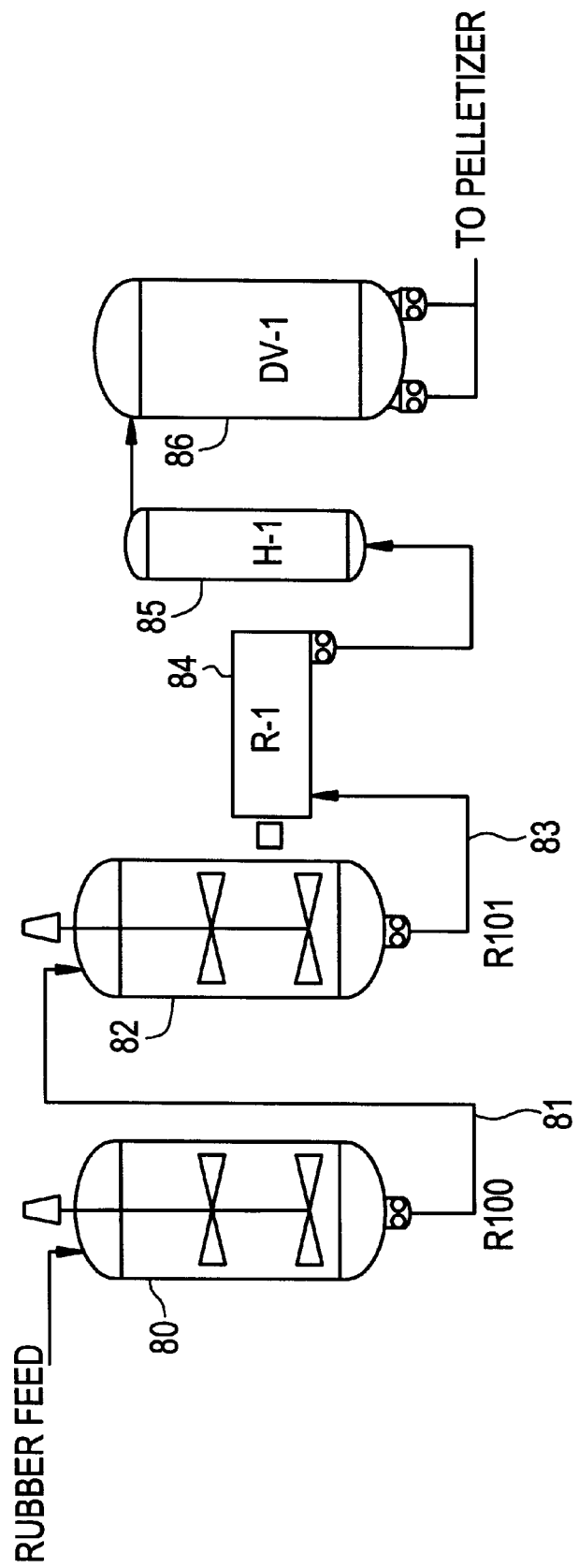
FIG. 3 is a simplified flow diagram illustrating a preferred embodiment of the high impact polystyrene polymerization and finishing portion of the invention.

Referring to FIG. 3, the styrene polymerization section of the invention, this stage of the HIPS process can be operated much the same as a conventional HIPS manufacturing process, wherein a styrene monomer feedstock has had a premanufactured polybutadiene or SBR type rubber, which has been ground into small particles, dissolved in it. More specifically, the solution discharged from the bottom of devolatilizer 64, containing from about 5 to about 12 weight percent polybutadiene dissolved in styrene monomer, is pumped by pump 72 to the first HIPS reactor 80 which comprises a Pre-Inversion Reactor (PIR) as more fully described in the aforementioned incorporated patent U.S. Pat. No. 4,777,210. The PIR is primarily of the continuous-stirred tank reactor type.

The solution is reacted in the PIR 80 and the viscosity monitored by monitoring the amperage drawn by the stirrer motor on the reactor, until the viscosity reaches the point just prior to where the solution has reached the inversion point of the syrene/polystyrene/polybutadiene mixture. The inversion point is that point where the solution goes from a matrix of styrene/rubber with particles of polystyrene, to a solution where the matrix is polystyrene with particles of polystyrene/rubber dispersed therein.

As the solution is stirred and reacted until measuring the viscosity indicates that it is producing product near the inversion point in PIR 80, the solution is pumped from the PIR 80, via flowline 81, to the Post Inversion Reactor 82 which is also preferably of the Continuous Stirred Tank Reactor type. Phase inversion begins essentially immediately after the feed solution enters Reactor 82 and the feed solution has a sufficient residence time in Reactor 82 to substantially complete the phase inversion.

From the Post Inversion Reactor 82, the solution is pumped from product line 83 into a third reactor comprising a Plug Flow Reactor (PFR) 84 where the polymerization is substantially completed. The solution is flowed from the PFR into a heat-exchanger 85 where it is heated preparatory to being devolatilized in Devolatilizer 86. From the Devol 86 the product stream is passed to a pelletizer (not shown) where the product is formed into solid pellets for shipment.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A method for making a rubber-modified monovinyl aromatic polymer wherein the rubber is polybutadiene, the method comprising the steps of:

introducing materials comprising butadiene, a preheated hydrocarbon solvent, and a polymerization catalyst into a continuous-stirred tank reactor;

controlling the temperature and reaction conditions to initiate polymerization of the butadiene to polybutadiene within the mixture;

polymerizing the butadiene until reaching a polybutadiene concentration of from about 9 to about 15 weight percent by weight of the mixture;

diluting the mixture containing the polybutadiene by introducing a monovinyl aromatic monomer;

heating the diluted mixture and flashing off the hydrocarbon solvent and unreacted butadiene monomer to produce a solution of polybutadiene in the monovinyl aromatic monomer;

forming a polymerizable mixture comprising the solution of polybutadiene in the monovinyl aromatic monomer;

controlling the temperature to polymerize the monovinyl aromatic monomer, thereby producing a monovinyl aromatic polymer containing grafted polybutadiene.

2. The method of claim 1 wherein the monovinyl aromatic monomer is selected from the group consisting of alphamethylstyrene and styrene.

3. The method of claim 2 wherein the monovinyl aromatic monomer is styrene.

4. The method of claim 1 wherein the hydrocarbon solvent is selected from the group consisting of hydrocarbon solvents having from 4 to 6 carbon atoms per molecule.

5. The method of claim 4 wherein the hydrocarbon solvent is selected from the group consisting of n-hexane and n-butane.

6. The method of claim 1 wherein the butadiene polymerization catalyst is a butyl lithium catalyst.

7. The method of claim 1 wherein the first polymerizable mixture further comprises tetrahydrofuran.

8. The method of claim 1 wherein the first polymerizable mixture further comprises a polymerization inhibitor.

9. The method of claim 1 wherein the butadiene is polymerized in a continuous-stirred tank reactor and a plug flow reactor.

10. The method of claim 1 wherein an antioxidant is introduced into the polybutadiene-containing mixture prior to introducing the monovinyl aromatic monomer.

11. The method of claim 1 wherein the butadiene is polymerized to a concentration of about 12 weight percent prior to diluting the mixture with the monovinyl aromatic monomer.

12. The method of claim 1 wherein the hydrocarbon solvent and unreacted butadiene monomer are flashed off in at least one vacuum devolatilizer.

13. The method of claim 12 wherein the hydrocarbon solvent and unreacted butadiene monomer are flashed off in two serially connected vacuum devolatilizers.

14. The method of claim 12 wherein the vacuum devolatilizer is operated at a vacuum of about 140 mbar.

15. The method of claim 1 wherein the hydrocarbon solvent is recovered and recycled.

16. The method of claim 1 wherein any flashed monovinyl aromatic monomer is recovered and recycled.

17. The method of claim 1 wherein the vinyl aromatic polymer is high impact polystyrene.

* * * * *